United States Patent
Prescott et al.

(10) Patent No.: US 6,372,024 B1
(45) Date of Patent: Apr. 16, 2002

(54) SYSTEM AND METHOD FOR REMOVING CONTAMINATING GASES FROM WATER

(76) Inventors: Russell E. Prescott, 8 Little River Rd., Kingston, NH (US) 03848; Perrin T. Prescott, 110 Watson Rd., Exeter, NH (US) 03833

( * ) Notice: Subject to any disclaimer, the term of this patent is extended or adjusted under 35 U.S.C. 154(b) by 0 days.

(21) Appl. No.: 09/588,965

(22) Filed: Jun. 7, 2000

(51) Int. Cl.[7] ............................................... B01D 19/00
(52) U.S. Cl. ............................... 95/263; 95/24; 95/262; 96/155; 96/157; 96/181; 96/204; 96/215; 96/220; 55/473
(58) Field of Search ........................... 96/155, 157, 181, 96/202, 203, 204, 206, 207, 215, 220; 55/467, 473; 95/24, 159, 170, 185, 230, 262, 263; 210/188

(56) References Cited

U.S. PATENT DOCUMENTS

| | | | | |
|---|---|---|---|---|
| 1,255,395 A | * | 2/1918 | Duram | 96/204 |
| 3,070,935 A | * | 1/1963 | De Leon | 96/206 |
| 3,193,989 A | * | 7/1965 | Sebeste | 96/157 |
| 3,344,587 A | * | 10/1967 | Wakeman | 96/206 |
| 4,371,383 A | | 2/1983 | Rost | 55/169 |
| 4,387,020 A | * | 6/1983 | Hill | 210/188 |
| 4,508,545 A | * | 4/1985 | DeLoach | 96/181 |
| 4,659,463 A | * | 4/1987 | Chandler et al. | 210/202 |
| 4,663,089 A | | 5/1987 | Lowry et al. | 261/23.1 |
| 4,861,352 A | * | 8/1989 | Cheng | 95/263 |
| 4,869,832 A | | 9/1989 | Lamarre | 210/747 |
| 5,045,215 A | | 9/1991 | Lamarre | 210/747 |
| 5,279,746 A | * | 1/1994 | Ziol | 95/159 |
| 5,352,276 A | | 10/1994 | Rentschler et al. | 95/246 |
| 5,614,086 A | * | 3/1997 | Hill et al. | 96/158 |
| 5,728,200 A | * | 3/1998 | Bekedam | 96/203 |
| 5,931,990 A | * | 8/1999 | Andrews | 96/220 |

* cited by examiner

Primary Examiner—Duane Smith
Assistant Examiner—Jason M. Greene
(74) Attorney, Agent, or Firm—Bourque & Associates, PA

(57) ABSTRACT

The system removes contaminating gases, such as radon, from water using a bubbling action. Contaminated water is sprayed together with air through a duct to a bottom region of a bubbling container. The water and air move generally in the same direction through the system, allowing the flow rate to be varied while maintaining forced air/water contact. The aerated contaminated water bubbles upwardly through the bubbling container and passes through one or more diffusing or mixing plates causing the aerated contaminated water to further break out contaminating gases into the air. At the top region of the bubbling container, the contaminating gases are vented while the decontaminated water flows into a tank. The decontaminated water can then be pumped to a desired location, for example, to a house water system. A control system controls the operation of the system based upon water needs by stopping the introduction of air and water into the system when the decontaminated water in the tank has reached a predetermined level.

20 Claims, 3 Drawing Sheets

SYSTEM AND METHOD FOR REMOVING CONTAMINATING GASES FROM WATER

FIELD OF THE INVENTION

The present invention relates to systems and methods for removing contaminating gases from water and more particularly, to a system and method for removing radon from water by bubbling the radon gas out of the contaminated water.

BACKGROUND OF THE INVENTION

The presence of the radioactive gas radon has been found in water supplies of New England and elsewhere in the world. Radon is a colorless, odorless, radioactive gas produced from the natural decay of uranium. In outdoor air, radon is diluted and not recognized as a health hazard. However, when radon gas is trapped indoors in air or water, in sufficiently high concentrations, it can be dangerous. Radon has been shown in several epidemiological studies to be a very potent carcinogen that causes lung cancer in humans.

Uranium, and therefore radon, is frequently found in granite bedrock deposits, which are common throughout the United States and the world. Radon typically enters a home along with the water from a bedrock well. Because radon is a volatile gas, it is given off by the water during common household activities such as bathing, showering, and washing dishes. Thus, the radon given off by the water becomes an inhalation hazard within a home or other building. The EPA has estimated that, on an average annual basis, each 10,000 pico-curies per liter (pCi/L) concentration of radon in the water supply will translate into an indoor air concentration of 1 pCi/L for homes having average air exchange rates. Currently, acceptable concentrations of radon are considered to be in the range of 300 to 4000 pCi/L. The contamination of drinking water with volatile organic chemicals, such as benzene, vinyl chloride and MTBE, has also recently become recognized as a serious health problem.

Different methods and systems have been developed to remove radon and other contaminating gases, such as volatile organic chemicals, from water. One such system is referred to as decay storage and comprises a large baffled water storage tank. Since radon has a radiological half-life of only 3.785 days, simply holding the contaminated water in a storage tank for approximately a month will greatly reduce the radon level. One problem with this type of decay storage is that it requires a large tank and is not suitable for use in a home where space may be limited.

Another example of decay storage requires accumulation of the radon on an absorbent material such as activated carbon. Since the radon decays relatively rapidly, the concentration of radon on the absorbent bed will initially increase, and then gradually reach an equilibrium with the influent radon concentration in the water. One disadvantage with this type of system is that the absorbent bed give off radioactivity, primarily in the form of gamma rays, as the radon decays, which may itself present a health hazard. A second disadvantage is that it is difficult to legally dispose of the radioactive carbon filter when it becomes fouled by other water-borne contaminants such as iron, sediment or bacteria.

Another method is known as spray aeration, for example, as disclosed in U.S. Pat. No. 4,371,383. In spray aeration systems, numerous cycles of spraying are required to achieve the desired removal efficiency. As a result, a relatively large spray tank would be required to provide a sufficient quantity of treated water for use in the home.

According to other methods, water is distributed through a tank while air is blown through the tank in a different direction than the water, for example, as disclosed in U.S. Pat. Nos. 4,869,832; 5,614,086; and 5,045,215. Because the water path is different than the air movement, the flow rates through these devices are limited in order to maintain the designed air/water contact without bypassing the aeration process. In U.S. Pat. No. 5,045,215, for example, water is sprayed onto a perforated tray 12 with air blown separately up through the perforated tray. Baffles 16 are used to direct the water flow and prevent back-mixing and cross-mixing of the froth, thereby achieving the desired air/water contact. If the water flow rate is increased beyond a certain point, however, the water will overflow the baffle 16 and the desired air/water contact will be bypassed. Blowing too much air will cause a similar result.

U.S. Pat. No. 5,614,086 has similar limitations. A series of double baffles is used to create a channel for cascading water flow. The water is aerated as it passes over and under the baffles. If the water or air rate is increased to a certain point, the water might overflow the baffles and not follow the desired flow path, causing the air/water contact to be bypassed. Thus, the systems and methods disclosed in both of these patents have an inherent limit on the flow rate.

Moreover, the available systems for removing radon often cannot easily be installed into the existing water system in a home. Systems such as those disclosed in U.S. Pat. Nos. 5,045,215 and 5,614,086 utilize external pump systems for pumping decontaminated water to a desired location and thus require a large amount of floor space and greater set-up installation time and effort. These devices, also typically incorporate complex control panels that must be installed and wired, increasing costs and requiring a specialized electrical hook-up.

Accordingly, there is a need for a system for removing radon or other contaminating gases that can easily be installed in a home, for example, without requiring an excessive amount of space. There is also a need for a system and method in which the air/water contact is directly proportional and will not be by-passed, even when the flow rate is increased. There is also a need for a method of removing radon or other contaminating gases from water that is efficient enough to remove the necessary amount of gas while being capable of higher flow rates because of a forced aeration or flow path.

SUMMARY OF THE INVENTION

A system for removing contaminating gases from contaminated water comprises a tank for holding decontaminated water and having a gas outlet for venting the contaminating gases removed from the contaminated water. A bubbling container is fluidly coupled to the tank such that decontaminated water flows from a top region of the bubbling container into the tank. A duct is at least partially disposed within the bubbling container with a first end of the duct positioned proximate a bottom region of the bubbling container. A second end of the duct is coupled to a source of contaminated water for introducing the contaminated water to the bottom region of the bubbling container.

In a preferred embodiment, a spraying connection, such as a nozzle/venturi, sprays the water into the second end of the duct. A blower is also coupled to the second end of the duct for blowing air into the duct as the contaminated water is introduced therethrough, thereby further aerating the contaminated water. At least one diffuser is positioned within the bubbling container for breaking up and further mixing the aerated contaminated water with the air. The aerated contaminated water rises to the top region of the bubbling container where the contaminating gases bubble out of the aerated contaminated water. According to one example, the diffuser includes one or more perforated grids disposed within the bubbling container. A pump pumps the decontaminated water from the tank.

The system preferably includes a control system for stopping the introduction of contaminated water and the blowing of air into the duct when the decontaminated water in the tank reaches a predetermined level. The control system preferably includes a normally closed valve coupled between the supply of contaminated water and the duct. The normally closed valve is opened when the decontaminated water is below the predetermined level. The control system further includes a float switch within the tank for switching off a power supply to the blower and to the normally closed valve when the decontaminated water in the tank reaches the predetermined level.

The present invention also features a method of removing contaminating gases from contaminated water. The method comprises the steps of supplying the contaminated water and introducing air together with the contaminated water into the bottom region of the bubbling container such that the air and the contaminated water flow generally in the same direction into the bubbling container through a forced flow path. The aerated contaminated water is forced to bubble up through the bubbling container to a top region of the bubbling container where the contaminating gases bubble out of the aerated contaminated water leaving decontaminated water to flow out of the bubbling container. The contaminating gases are vented and the decontaminated water is pumped to a desired location.

According to the exemplary method, the contaminating gases include radon, the water supply is a home water supply, and the desired location is a home water system. The method preferably includes the step of stopping the supply of contaminated water and the introduction of air when the decontaminated water in the tank reaches a predetermined level.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
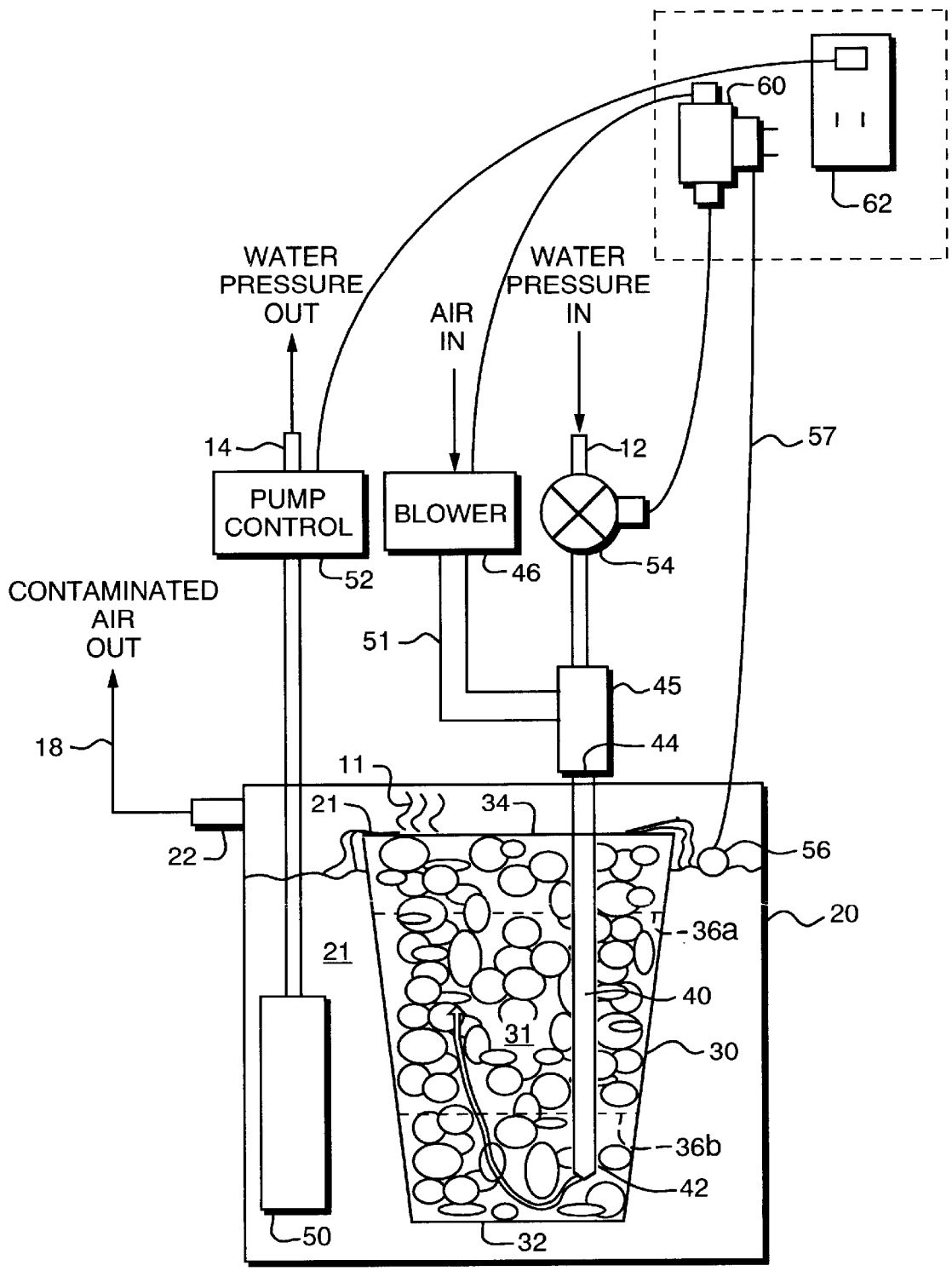
FIG. 1 is a schematic diagram of the system for removing contaminating gases from water, according to one embodiment of the present invention.

The system 10, FIG. 1, according to the present invention, is used to remove contaminating gases 11, such as radon and volatile organic chemicals, from water. In the exemplary embodiment, the system 10 for removing contaminating gases from water is installed in a house between a water supply line 12 from a well or other water source and a water delivery line 14 to the house water system. The system 10 for removing contaminating gases 11 from water can also be installed within other types of residential or commercial buildings. The contaminating gases such as radon removed from the water are preferably vented to an exterior of the house through a vent 18.

The system 10 includes a tank 20 that holds the decontaminated water 21 and vents the contaminating gases 11 through one or more gas outlets 22 extending from the tank 20. The tank 20 has a capacity of about 120 gallons and is preferably about the size of a standard clothes washer. The tank 20 is preferably made of a polymer material, such as FDA approved polyethylene.

A bubbling container 30 is fluidly coupled to the tank 20 to contain aerated contaminated water 31 that bubbles upwardly from a bottom region 32 to a top region 34 of the bubbling container 30. In the exemplary embodiment shown in FIG. 1, the bubbling container 30 is positioned within the tank 20 such that the decontaminated water 21 overflows from the top region 34 into the tank 20 after the contaminating gases 11 have bubbled out of the water 31. The bubbling container 30 is preferably made of FDA approved polyethylene and has a capacity of about 30 gallons.

Figure 2:
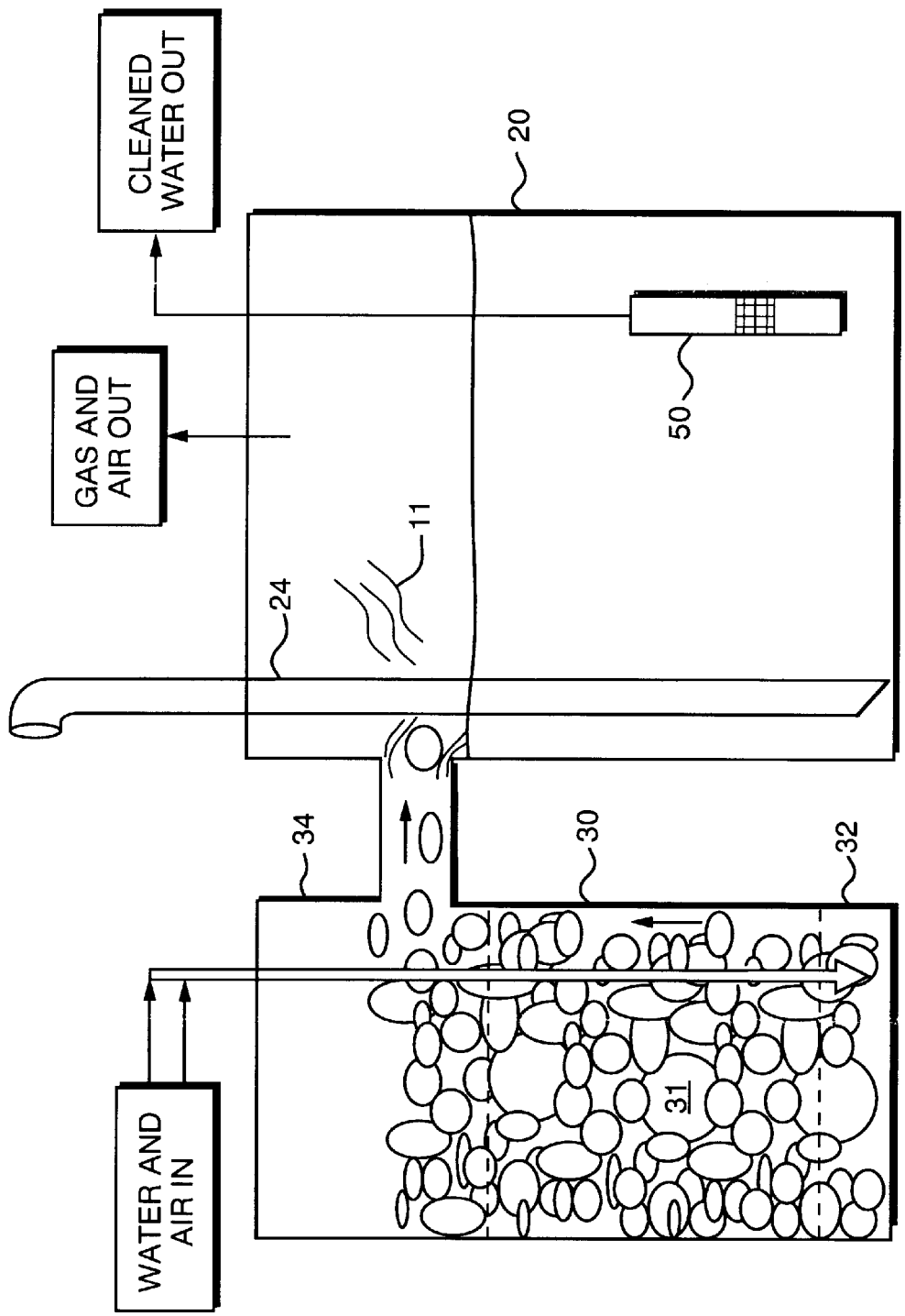
FIG. 2 is a schematic diagram of another embodiment of the system for removing contaminating gasses from water.

According to another embodiment, the bubbling container 30, FIG. 2, is outside of and is fluidly connected to the tank 20 proximate the top region 34. As in the previous embodiment, the aerated water 31 bubbles upwardly from the bottom region 32 to the top region 34 of the bubbling container 20 and flows into the tank 20. The gas is removed from the top of the tank 20, and the decontaminated water is pumped out of the tank 20.

In either embodiment, an overflow relief pipe 24 can be used to relieve pressure in the tank 20. In one example, the overflow relief pipe 24 is positioned within the tank 20 and extends above the tank 20, for example, about 12 inches. When the water pressure in the tank 20 causes the water to rise above the tank 20 and to the top of the pipe 24, the water will flow out of the pipe 24 to a gravity drain.

The bubbling container 30 includes a diffuser, such as one or more diffusing plates 36a, 36b, that break up the aerated contaminated water 31 as it bubbles up through the bubbling container 30. The diffusing plates 36a, 36b can be any type of grid, perforated plate, or baffle having an array of holes with a size of about ⅛ to ½ inch. In the exemplary embodiment, the bottom diffusing plate 36b preferably breaks up and diffuses the aerated water 31 as it rises from the bottom region 32 of the bubbling container 30. The top diffusing plate 36a helps to "break up" and mix the aerated water 31 further as it rises to the top region 34 of the bubbling container 30.

Other types of diffusers that can be used include ball-shaped elements (e.g., ping pong balls) or other diffusing media that will create a tortuous path, distribute the surface area of the water, and break up the water for gas removal.

A duct 40 is at least partially disposed within the bubbling container 30 with a first end 42 of the duct 40 positioned proximate the bottom region 32 of the bubbling container 30. A spray connection 45 at the second end 44 of the duct 40 aerates and sprays the water from the water supply 12 into the duct 40. A blower 46 is also coupled to the spray connection 45 to further aerate the water as the water is sprayed into the duct 40.

Figure 3:
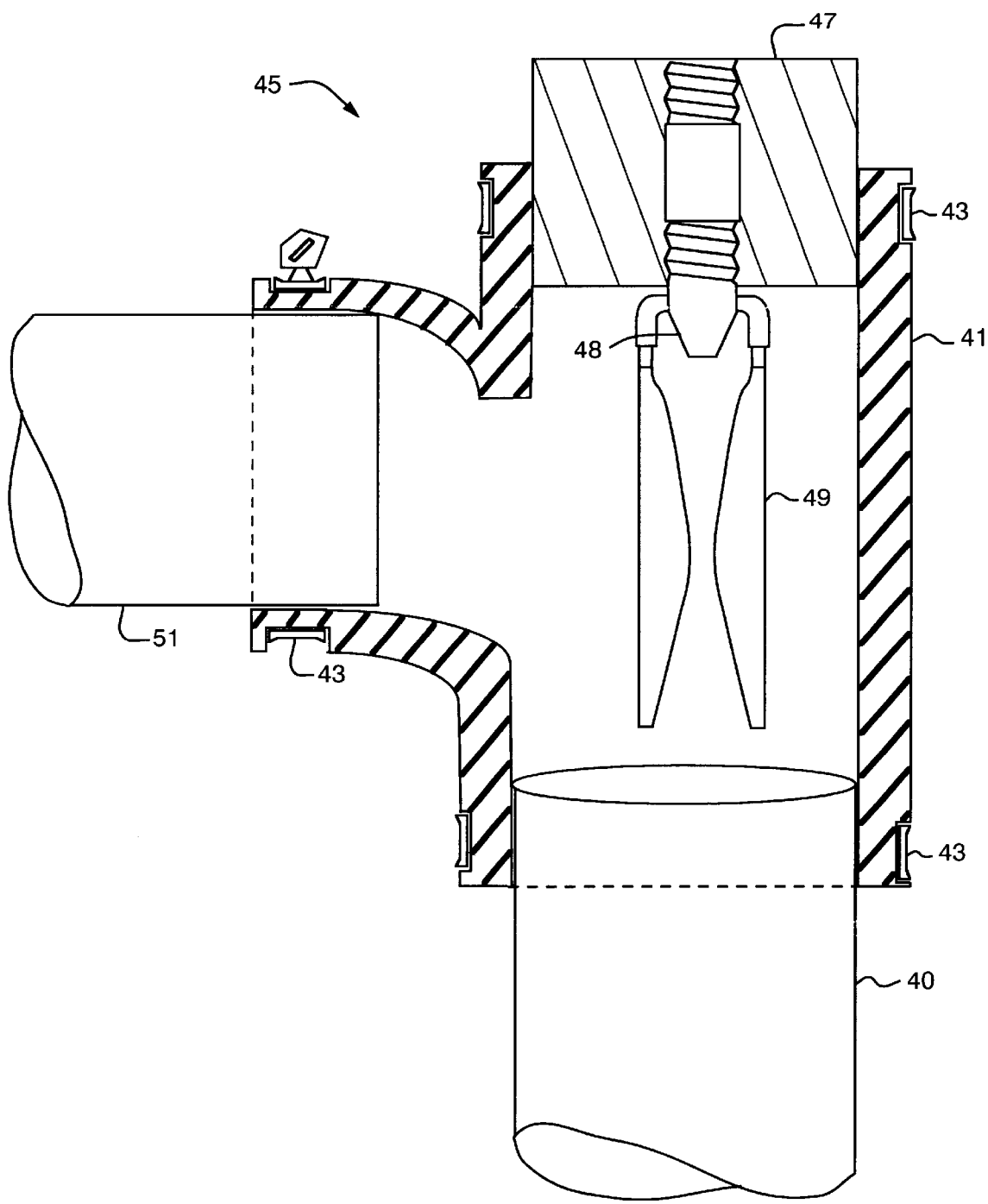
FIG. 3 is a partially cross-sectional view of the spray connection used in the system, according to one embodiment of the present invention.

In a preferred embodiment, the spray connection 45, FIG. 3, includes a nozzle 48 and venturi 49 connected to the water supply using a pipe thread connection 47. In this embodiment, a rubber "Fernco" tee 41 or other similar connector connects the pipe thread connection 47 and the blower duct 51 to the duct 40, for example, using clamping bands 43. The spray connection 45 thus allows air to be blown into the duct 40 as the contaminated water is sprayed into the duct 40 using the nozzle 48 and venturi 49.

The duct 40 directs the contaminated water and air down to the bottom region 32 of the bubbling container 30. The duct 40 is preferably made out of PVC pipe, has a length of about 3 feet and a diameter of about 3 inches. One example of the blower 46 is a GAST blower, No. R4110-2, available from GAST Manufacturing, Inc., of Benton Harbor, Mich.

The system 10 also includes a pump 50 for pumping the decontaminated water out of the tank 20 to a desired location, such as the house water system. In the exemplary embodiment, the pump 50 is a conventional submersible well pump positioned within the tank 20 and having a conventional pump control 52 such as a HYDROTRONIC control available from Leader Pumps, Inc. of Ladson, S.C., for controlling the pumping of the water from the tank 20 to the water delivery line 14. Other types of pumps can also be used to remove the decontaminated water from the tank.

The system 10 for removing contaminating gases from water also preferably includes a control system that controls the operation of the system 10 based upon water needs. In the exemplary embodiment, the control system includes a valve 54 coupled between the spray connection 45 and the water supply line 12 for controlling the supply of water into the system 10. One example of this valve 54 is a normally closed solenoid water valve that is opened only when the decontaminated water in the tank 20 is below a predetermined level.

The control system also includes a float switch 56 that floats in the tank 20 and detects when the decontaminated water in the tank 20 reaches the predetermined level. One example of the float switch 56 is a Pump Master available from S. J. Electro, Wis. The float switch 56 includes a cord 57 that plugs into a power supply, such as a duplex 115 volt 15 amp outlet 62. The blower 46 and valve 54 are connected to a splitter 60, which is connected "piggy-back" to the outlet 62 through the float cord 57. The float switch 56 causes the power supply control 60 to shut off power to the blower 46 and the valve 54 when the decontaminated water reaches the predetermined level in the tank 20, thereby shutting off the blower and closing the valve 54.

To install, the system 10 is easily piped in and out of the house water system and plugged in to the power supply. The system is piped in by coupling the water supply line 12 to the valve 54. The system 10 is piped out by coupling the pump control 52 to the water delivery line 14. The gas outlet 22 can be coupled to the vent 18 to the exterior of the house. The pump control 52 is plugged in to the outlet 62, and the cord 57 of the float switch 56 is plugged into the outlet 62. The blower 46, normally closed solenoid water valve 54, and float 56 are plugged in to the splitter 60, which is plugged into the cord 57 of the float switch 56.

During operation, when float 56 falls to a predetermined water level, power is supplied to open valve 54 and start blower 46. Air is thereby introduced together with the contaminated water through the duct 40 and to the bottom region 32 of the bubbling container 30. Contaminated water flows through the spray connection 45 (e.g., the nozzle 48 and venturi 49), drawing air into the water stream and into duct 40. The blower 46 blows air into the duct 40 for further aerating and spraying contaminated water into the duct 40.

The aerated contaminated water 31 bubbles upwardly from the bottom region 32 of the bubbling container 30 through the diffuser plates 36a, 36b to the top region 34 of the bubbling container 30. The bubbling action and diffusion action of the diffuser plates 36a, 36b break out the contaminating gases from the water into the air at the top region 34 and the decontaminated water 21 spills over or flows into the tank 20 as the contaminating gases 11 are removed through the gas outlet 22. Since the air and contaminated water (together making up the aerated water 31) move generally in the same direction in a contained or forced flow path through the duct 40 and through the bubbling container 30, the flow rate can be increased without by-passing the air/water contact.

The pump 50 pumps decontaminated water out of the tank 20 as is needed, for example, as water is drawn off from the house water system. If water is not needed, the level of the decontaminated water will rise in the tank 20 until it reaches the predetermined level at which the float switch 56 causes power to be shut off to the valve 54 and blower 56. The valve 54 then closes and shuts off the supply of water to the system and the blower 46 shuts off the supply of air to the system. When water is drawn off, the level of decontaminated water drops below the predetermined level, and the valve 54 and blower 46 are activated to supply the water and air to the system. In case of overflow, the water can be relieved through the overflow relief pipe 24.

Accordingly, the system of the present invention is capable of removing contaminating gases, such as radon, from water efficiently and without requiring a large amount of space and a complex installation. The system and method of the present invention also allows the flow rate through the system to be varied. The system 10 of the present invention is capable of operating at about 99.4 percent efficiency and is capable of lowering the radon concentration from 31,000 pCi/L down to 190 pCi/L.

Modifications and substitutions by one of ordinary skill in the art are considered to be within the scope of the present invention which is not to be limited except by the claims which follow.

What is claimed is:

1. A system for removing contaminating gases from contaminated water, said system comprising:

a tank for holding decontaminated water, said tank having a gas outlet for venting said contaminating gases removed from said contaminated water;

a bubbling container fluidly coupled to said tank, wherein said decontaminated water flows from a top region of said bubbling container into said tank;

a duct at least partially disposed within said bubbling container, wherein a first end of said duct is positioned proximate a bottom region of said bubbling container, and wherein a second end of said duct is coupled to a source of contaminated water for introducing said contaminated water to said bottom region of said bubbling container;

a blower coupled to said second end of said duct for blowing air into said duct as said contaminated water is introduced therethrough, producing aerated contaminated water;

at least one diffuser positioned within said bubbling container for breaking up said aerated contaminated water as said aerated contaminated water rises to said top region of said bubbling container, wherein said contaminating gases bubble out of said aerated contaminated water at said top region; and a pump for pumping decontaminated water from said tank.

2. The system of claim 1 wherein said at least one diffuser includes al least one diffusing plate.

3. The system of claim 1 wherein said at least one diffuser includes a plurality of diffusing plates.

4. The system of claim 1 further including a spray connection connected to said supply of contaminated water, for spraying said contaminated water into said duct.

5. The system of claim 4 wherein said spray connection includes a nozzle and a venturi.

6. The system of claim 1 further including a pump control coupled to said pump for controlling the pumping of water out of said tank.

7. The system of claim 1 further including a control system for stopping the introduction of contaminated water and blowing of air into said duct when said decontaminated water in said tank reaches a predetermined level.

8. The system of claim 7 wherein said control system includes a normally closed valve coupled between said supply of contaminated water and said duct, wherein said normally closed valve is opened when said decontaminated water is below said predetermined level.

9. The system of claim, 8 wherein said control system includes a float switch within said tank, wherein said float switch connects said normally closed valve and said blower to a power supply, for switching off said power supply to said blower and to said normally closed valve when said decontaminated water in said tank reaches said predetermined level.

10. The system of claim 1 further including an overflow relief pipe connected to said tank.

11. The system of claim 1 wherein said bubbling container is disposed outside of said tank.

12. The system of claim 1 wherein said bubbling container is disposed within said tank such that said decontaminated water overflows into said tank.

13. A method of removing contaminating gases from contaminated water, said method comprising the steps of:

supplying said contaminated water from a water supply;

blowing air into said contaminated water;

introducing said air together with said contaminated water into a bottom region of a bubbling container forming aerated contaminated water, wherein said air and said contaminated water flow generally in the same direction into said bubbling container through a forced flow path;

allowing said aerated contaminated water to bubble up through said bubbling container to a top region of said bubbling container where said contaminating gases bubble out of said aerated contaminated water leaving decontaminated water to flow out of said bubbling container;

venting said contaminating gases; and flowing said decontaminated water to a desired location.

14. The method of claim 13 wherein said aerated contaminated water is diffused as said aerated contaminated water bubbles up through said bubbling container.

15. The method of claim 13 wherein said contaminating gases include radon.

16. The method of claim 13 wherein said water supply is a home water supply, and wherein said desired, location is a home water system.

17. The method of claim 13 wherein said decontaminated water flows into a tank, further including the steps of:

stopping said step of introducing said air together with said contaminated water when said decontaminated water in said tank reaches a predetermined level.

18. The method of claim 13 wherein said bubbling container is disposed in a tank, and wherein said decontaminated water flows out of said bubbling container into said tank.

19. A method of removing contaminating gases from contaminated water, said method comprising the steps of:

supplying said contaminated water from a water supply;

introducing air together with said contaminated water into a bottom region of a bubbling container forming aerated contaminated water, wherein said air and said contaminated water flow generally in the same direction into said bubbling container through a forced flow path;

allowing said aerated contaminated water to bubble up through said bubbling container to a top region of said bubbling container such that said aerated water is forced up through an array of holes in diffusing plates arranged in said bubbling container, wherein said contaminating gases bubble out of said aerated contaminated water leaving decontaminated water to flow out of said bubbling container;

venting said contaminating gases; and flowing said decontaminated water to a desired location.

20. The method of claim 19 further including the step of blowing air into said contaminated water to produce said aerated contaminated water.

* * * * *